(12) United States Patent
Lim et al.

(10) Patent No.: US 11,878,266 B2
(45) Date of Patent: Jan. 23, 2024

(54) REGENERABLE AIR FILTER

(71) Applicant: Camfil AB, Stockholm (SE)

(72) Inventors: Boon Han Lim, Ipoh Perak (MY);
Cheah Wei Ng, Ipoh Perak (MY)

(73) Assignee: Camfil AB, Stockholm (SE)

( * ) Notice: Subject to any disclaimer, the term of this patent is extended or adjusted under 35 U.S.C. 154(b) by 156 days.

(21) Appl. No.: 17/678,690

(22) Filed: Feb. 23, 2022

(65) Prior Publication Data

US 2022/0274047 A1 Sep. 1, 2022

(30) Foreign Application Priority Data

Feb. 26, 2021 (SE) .................................... 2150216-6

(51) Int. Cl.
*B01D 53/04* (2006.01)

(52) U.S. Cl.
CPC ..... *B01D 53/0423* (2013.01); *B01D 53/0454* (2013.01); *B01D 2253/102* (2013.01);
(Continued)

(58) Field of Classification Search
CPC ............ B01D 53/0423; B01D 53/0454; B01D 2253/102; B01D 2253/202; B01D 2253/25; B01D 2253/3425; B01D 2257/702; B01D 2257/708; B01D 2259/40086; B01D 2259/40094; B01D 2259/40096; B01D 2259/4145; B01D 53/96; B01D 53/0407;
(Continued)

(56) References Cited

U.S. PATENT DOCUMENTS 3,513,643 A * 5/1970 Tarala ................ B01D 46/0036
55/497
4,259,096 A * 3/1981 Nakamura ......... B01D 39/1607
96/138

(Continued)

FOREIGN PATENT DOCUMENTS

CN 107362701 A 11/2017
TW 201943449 A 11/2019
(Continued)

OTHER PUBLICATIONS

Office Action Issued in corresponding Taiwan Application No. 110107939, dated Mar. 22, 2022.
(Continued)

*Primary Examiner* — Frank M Lawrence, Jr.
(74) *Attorney, Agent, or Firm* — Dinsmore & Shohl LLP (57) ABSTRACT

A heat resistant regenerable air filter assembly for an air supplying application an air permeable adsorbent panel (1) mounted in a frame (2), said panel comprising a heat resistant structure comprising a heat resistant porous adsorbent material for adsorbing molecular contamination and being configured to be regenerated by desorption, and said air filter assembly comprising a heat resistant sealing material (3) between the adsorbent panel and the frame, where the heat resistant sealing material is a carbon fiber felt material arranged between the air permeable adsorbent panel and the frame so as to fill the distance therebetween, thereby preventing leakage of unfiltered air through the heat regenerable air filter assembly; and a method (100) of regenerating the air filter assembly.

20 Claims, 6 Drawing Sheets (52) U.S. Cl.
CPC .... *B01D 2253/202* (2013.01); *B01D 2253/25* (2013.01); *B01D 2253/3425* (2013.01); *B01D 2257/702* (2013.01); *B01D 2257/708* (2013.01); *B01D 2259/40086* (2013.01); *B01D 2259/40094* (2013.01); *B01D 2259/40096* (2013.01); *B01D 2259/4145* (2013.01)

(58) Field of Classification Search
CPC .............. B01D 46/521; B01D 46/0002; B01D 46/0036; B01D 41/00; B01D 46/0005; B01D 46/0097; B01D 46/84; B01D 2239/0457; B01D 53/04; B01D 46/52; F24F 3/16
USPC ..... 95/106, 148; 96/143, 146, 151, 153, 154
See application file for complete search history.

(56) References Cited

U.S. PATENT DOCUMENTS

| | | | |
|---|---|---|---|
| 5,980,612 A | 11/1999 | Kelly | |
| 6,336,948 B1* | 1/2002 | Inoue | B32B 27/322 55/497 |
| 6,379,438 B1* | 4/2002 | Schneider | B01D 46/0005 55/497 |
| 2004/0035094 A1* | 2/2004 | Jersey | B01D 46/2414 55/498 |
| 2004/0187750 A1 | 9/2004 | Raichle et al. | |
| 2011/0061352 A1 | 3/2011 | Stahl et al. | |
| 2012/0067215 A1 | 3/2012 | Lindahl et al. | |
| 2013/0125748 A1 | 5/2013 | Taylor et al. | |
| 2018/0193784 A1* | 7/2018 | Englund | B01D 39/2017 |

FOREIGN PATENT DOCUMENTS

| | | |
|---|---|---|
| WO | 9312858 A1 | 7/1993 |
| WO | 2010101520 A1 | 9/2010 |

OTHER PUBLICATIONS

Office Action issued in corresponding Swedish Patent Application No. 2150216-6, dated Nov. 23, 2021.

European Search Report dated Jul. 18, 2022 pertaining to Application No. EP 22 15 8442.

Taiwanese Office Action.

\* cited by examiner

REGENERABLE AIR FILTER

CROSS-REFERENCE TO RELATED APPLICATIONS

This application claims priority to Swedish Patent Application No. 2150216-6 filed Feb. 26, 2021, the contents of which are hereby incorporated by reference in their entirety.

TECHNICAL FIELD

The present disclosure relates to a heat resistant regenerable molecular/AMC air filter assembly for an air supplying application and a method of regeneration.

BACKGROUND ART

Air filter assemblies for use in air supplying applications, such as clean room applications or HVAC systems for general ventilation of buildings, typically include a frame retaining a filter element in the form of an air permeable adsorbent filter panel. The filter panel is typically sealed along its edges to the frame to prevent air from bypassing the filter panel as it flows through the filter.

Many filter designs utilize potting or adhesive compounds, in particular polyurethane, that flow around the edges of the filter panel to seal it to the frame. This way of sealing the filter panel to the frame is especially useful in the case of pleated filter panels, which may be difficult to seal along their pleated edges or sides. Sealing the filter panel to the frame by means of potting or adhesive generally provides a reliable seal.

It is important that air filters for use in air supplying applications have sufficient air filtration efficiency and capacity for the intended purpose, so that the filter fulfils the requirements set by the specific air filtration application.

In the area relating to clean rooms and the microelectronic industry, the removal of Airborne Molecular Contamination (AMC) in the form of acids, bases, condensables, dopants, oxidants and volatile organic compounds (VOC) of any molecular size is achieved by molecular filters and filter elements. AMC may cause corrosion of process wafers, circuit boards, tools, instruments etc. AMC can also cause doping errors, nucleation errors, lithography process related defects, hazing of wafers, optics, lenses and numerous other problems that may generate yield losses in the production or damage to the production equipment.

Modern HVAC systems for general ventilation of buildings may also include molecular filters in order to remove compounds that may constitute a health hazard e.g. ozone $O_3$, nitrogen dioxide $NO_2$, sulfur dioxide $SO_2$ and VOC's. Other compounds may further be generated indoors, and may reach the HVAC system if it uses recirculation. In the following the term molecular contamination is used to refer to all of the different compounds discussed above, also including the ones for general filtration but limited to compounds that can be detached from an adsorbent using a process involving elevated temperatures and/or reduced air pressure. In the 1990s, the term AMC was used for semiconductor production facilities referring to damage scenarios seen when the used line widths of semiconductor circuitry was 250 nm. Later and increasingly as the line width have been reduced, additional contaminating compounds have been added to the concept of AMC, where a main part is low molecular size volatile organic compounds. This latter group is especially hard to remove by adsorption filters leading to short service lice cycles of the filters and thus a high filter cost.

Increasing focus on sustainability and cost reduction in air supplying applications involving adsorption of molecular contamination has led to increasing demands of the air filters to be regenerable. It has traditionally been considered impossible to regenerate cleanroom filters due to the strict requirements on filtration efficiency applied on such filters. However, it has recently been found that, if all components of the air filter for cleanroom environment are made of heat resistant materials and have a design that can withstand high temperature, regeneration can be performed with adequate result by subjecting the filter to hot air treatment in order to remove the molecular contamination absorbed by the filter. WO2010/101520A1 discloses an example of a cleanroom air filter, which is comprised of heat resistant filter media attached to a frame by heat resistant sealant, such as polyurethane.

The focus on sustainability and cost reduction is still increasing, and it is therefore a need for regenerable filters for air supplying applications that can meet these continuously increasing demands.

SUMMARY OF THE INVENTION

The present disclosure relates to a heat resistant regenerable air filter assembly for an air supplying application, comprising an air permeable adsorbent panel mounted in a frame, the panel comprising a heat resistant structure comprising a heat resistant porous adsorbent material for adsorbing airborne molecular contamination and being configured to be regenerated by desorption. The heat resistant regenerable air filter assembly comprises a heat resistant sealing material between the adsorbent panel and the frame, which is a carbon fiber felt material arranged between the air permeable adsorbent panel and the frame so as to fill the distance between, thereby preventing leakage of unfiltered air through the heat regenerable air filter assembly. Preferably, the pressure drop over the carbon fiber felt seal as mounted is considerably higher than the pressure drop over the adsorbent panel, preferably at least 2 times higher, more preferably at least 5 times higher, most preferably at least 10 times higher. The air permeable adsorbent panel may suitably exhibit a pressure drop less than 100 Pa, preferably less than 60 Pa, at 0.7 m/s face velocity. The combination an air permeable adsorbent panel with a compressible carbon fiber felt material as sealing material improves the regeneration properties of the air filter assembly, so that it can withstand a greater number of regeneration cycles, thus reducing cost and making it more sustainable.

The carbon fiber felt material may preferably be a compressible and preferably recoverable material, which when installed in the air filter assembly, has a thickness of 50-70% of the carbon fiber felt material thickness before installation between the air permeable adsorbent panel and the frame. The carbon fiber felt material may suitably be in the form of one or more strips or bands having a combined total length at least corresponding to the circumference or perimeter of the air permeable adsorbent panel.

The adsorbent panel can preferably be a pleated filter media panel, and a part of the carbon fiber felt may then be folded to enclose the edge of the filter media at the outermost pleat on each side of the adsorbent panel. Another part of the carbon fiber felt may be arranged substantially flat against the edges of the pleats in a cross-pleat direction on each side of the adsorbent panel.

A clamp may be arranged along the outermost pleat in order to secure the carbon fiber felt folded to enclose the edge of the filter media at the outermost pleat against the inner side of the frame.

The heat resistant structure is preferably self-supporting and may include a self-supporting carrier structure holding the heat resistant porous adsorbent material for adsorbing the molecular contamination, the self-supporting carrier structure may preferably comprise heat resistant fibers. The adsorbent panel may further comprise a heat resistant support member, preferably in the form of a grid having a three-dimensional shape corresponding to the shape of the adsorbent panel.

If desired, the carbon fiber felt material may include activated carbon fiber to add an adsorption functionality in addition to the sealing functionality.

The adsorbent panel and the sealing carbon fiber felt are suitably mounted in the frame, and the frame is advantageously comprised of frame elements and fixtures that can be disassembled, so that the carbon felt and adsorbent panel can be removed.

The air permeable adsorbent panel is suitably heat resistant to melting and burning for temperatures up to at least 300° C., and is advantageously configured to withstand regeneration by heated gas flow at a temperature of 100-300° C. at 1 atm, or the air permeable adsorbent panel may be heat resistant to melting and burning for temperatures up to 300° C., and be configured to withstand regeneration by heated gas flow at a static pressure below 1 atm at a temperature of 50-300° C., or alternatively the air permeable adsorbent panel may configured to withstand regeneration by an evacuation below 1 atm and clean gas refilling procedure.

The air supplying application mentioned above may preferably be a cleanroom application or an HVAC system for general ventilation of a building.

The present disclosure also relates to a method of regenerating the air filter assembly described above, comprising the following steps: Demounting the heat resistant regenerable air filter assembly from a service position in an air handling system of a facility including an air supply application; Mounting the heat resistant regenerable air filter assembly in a regeneration equipment; Performing a regeneration cycle until a specified cleanliness or outgassing level are achieved; Demounting the regenerated heat resistant regenerable air filter assembly from the regeneration equipment; Remounting the regenerated heat resistant regenerable air filter assembly back into it's service position. The method may further preferably comprise the following steps: After demounting the heat resistant regenerable air filter assembly from its service position in the air handling system of the a facility including the air supply application, placing it in a specified transport container and transporting it to a regeneration facility comprising the regeneration equipment; and After demounting the heat resistant regenerable air filter assembly from the regeneration equipment, placing it in a fresh specified transport container and transporting it back to the facility including the air supply application; and optionally storing the regenerated heat resistant regenerable air filter assembly under gas clean conditions until taken back into service. The regeneration cycle may preferably involve exposing the air filter assembly to: a) a heated gas flow at a temperature of 100-300° C. at 1 atm or a heated gas flow at a static pressure below 1 atm at a temperature of 50-300° C. until a desired desorption of the molecular contamination has been achieved; or, b) evacuation below 1 atm and clean gas refilling procedure, which may be repeated until a desired desorption of molecular contamination has been achieved.

The present disclosure also relates to an air filter assembly as described above, which is regenerable by the above method.

DETAILED DESCRIPTION

The present invention aims at providing a heat resistant regenerable air filter assembly for air supplying application, which can meet the increasing demands on sustainability and cost reduction while, if required, being suitable for use in applications requiring an extreme level of cleanliness e.g. semiconductor and microelectronics production. This offers the possibility of replacement of air filter panels in existing equipment for air supplying applications with regenerable alternatives, aiming at providing regenerable panels that fulfil all requirements previously set, while at the same time allowing the panels to be regenerated multiple times. This is beneficial in air supplying applications involving adsorption of molecular contamination in general and in cleanrooms for manufacturing micro-electronics and an HVAC systems for ventilation of buildings in particular. The physico-chemical mechanisms involved in the removal of molecular contamination can be described as follows: The gas/vapour contamination molecules diffuse inside the adsorbent, i.e. they move from an area of high concentration to an area of low concentration. The rate of diffusion is directly related to the difference between the two concentrations. As the available sites on the internal surface of the adsorbent is occupied by retained gas/vapour molecules, the filter efficiency starts to decrease. The properties of the internal surface, i.e. the active surface groups present, and, most important, the pore size distribution, will determine which gas or vapour molecules that are withheld and also how strong they are adsorbed to the internal surfaces of the adsorbent. Other determining properties in the case of physiosorbed organic compounds are the molecular weight and boiling point of the gas or vapour molecules to be removed. Smaller organic molecules will have a lower boiling point and therefore become less strongly adsorbed. When the effluent gas/vapour downstream the filter reaches a threshold level, i.e. reaching the end of the present service cycle the filter needs to be replaced by a fresh, i.e. new or regenerated, one. The time, or air flow volume, to reach the threshold level will thus depend on the size of the adsorbed molecules that needs to be removed in the specific air filter application, where smaller molecules will cause the filter to reach the threshold level faster than larger molecules, thus decreasing the service cycle. At the end of the service cycle, the filter is taken out from its service position and sent to regeneration, and a fresh filter is installed in its place.

Within the present invention, it has now been realised that if the air permeable adsorbent panel has appropriate properties, carbon fiber felt can be used as sealing material between the frame assembly and the adsorbent panel. Accordingly, by combining an air permeable adsorbent panel having a limited pressure drop, with a compressible carbon fiber felt material as sealing material, the seal between the adsorbent panel and the frame assembly will be sufficient to ensure that the pressure drop over the carbon fiber felt seal "as mounted", i.e. so that any flow of air must pass through the felt material in a direction parallel to the air flow through the air filter assembly and substantially in the direction of the inner wall of the frame, i.e. perpendicular to the direction of compression of the felt material, is considerably higher than the pressure drop over the adsorbent panel, making it tight enough to preserve and even increase the removal efficiency of the gas or vapour molecules that the filter is intended to filtrate. Preferably, the pressure drop over the carbon fiber felt seal as mounted is at least 2 times higher, more preferably at least 5 times higher, most preferably at least 10 times higher than the pressure drop over the adsorbent panel.

The traditional sealant used for seals between filter media panels and frames in filters for clean room applications has typically been potting materials or adhesive compounds, especially polyurethane, because these materials provide an extremely reliable airtight seal. An absolutely air tight seal is considered crucial for high end particle filtration i.e. for filters in the HEPA and ULPA range in high end clean room application, e.g. semiconductor or microelectronics production, where it is necessary that no unfiltered air can bypass the filter and enter into the clean room, and it has also made it possible to obtain an airtight seal in the case of adsorbent panels with a more complicated shape, such as pleated adsorbent panels. The media panel of such particle filters typically have a pressure drop of at least 150 Pa (glass fiber media), or 100 Pa (PTFE media) at a face velocity of 0.7 m/s. Moreover, a pleated filter media panel may often be brittle, or soft and flexible and must therefore be securely held in the frame by means of e.g. potting material or adhesive to prevent it from collapsing or leaking. The same type of potting materials or adhesive compounds have hitherto been used as sealants, for all types of filter, including filter with lower pressure drop, such as molecular adsorbent filters and also such that is intended for regeneration applications.

Even though some potting materials or adhesive compounds are heat resistant and can withstand multiple regeneration cycles, they may suffer damage earlier than the adsorbent filter media is exhausted, so that the sealant may reach its end of life, while the adsorbent filter panel could, in theory, still have been further regenerated in many more regeneration cycles.

The present invention relates to a heat resistant regenerable air filter assembly for an air supplying application comprising an air permeable adsorbent panel mounted in a frame. The panel comprises a heat resistant structure comprising a heat resistant porous adsorbent material for adsorbing molecular contamination and is configured to be regenerated by desorption. The air permeable adsorbent panel preferably exhibits a pressure drop less than 100 Pa at a panel face velocity of 0.7 m/s, preferably less than 60 Pa at a panel face velocity of 0.7 m/s, or corresponding lower pressure drop at a lower face velocity. A heat resistant sealing material in the form of a carbon fiber felt material is arranged between the adsorbent panel and the frame, so as to fill the distance between.

In use, in air filtering in the air supplying application, the carbon fiber felt material will provide adequate sealing between the adsorbent filter panel and the frame, thereby preventing leakage of unfiltered air through the heat regenerable air filter assembly. The air to be filtered by the adsorbent air filter assembly will pass through the adsorbent panel due to the relatively low pressure drop thereof, suitably 15-100, preferably 15-60 Pa at 0.7 m/s face velocity. Thus, even though the compressible carbon fiber felt seal might not be as air-tight as a seal made of potting material or adhesive, it will provide a sufficient seal, since the pressure drop over the carbon fiber felt seal will exceed the pressure drop over the adsorbent filter panel.

A carbon fiber felt can withstand at least as many regeneration cycles as the air filter media of the absorbent panel. Accordingly, the combination of the adsorbent panel with the specified pressure drop and the carbon fiber felt seal allows for air filtration according to the requirements set for clean room applications and at the same time provides a filter assembly where all components thereof can withstand as many regeneration cycles as the adsorbent panel, thereby extending the service life of the filter and thus improving sustainability and decreasing cost while conforming to the cleanliness demands for the most demanding applications.

When the adsorbent panel is made from pleated media with adsorbent material in bead, granule or fiber form, the carbon fiber felt material of the sealing will contribute in preventing any possible amounts of adsorbent material from escaping from the edges of the adsorbent panel.

The carbon fiber felt used for the seal may preferably be an outgassing-free material. From a pure scientific standpoint, no material is completely outgassing free. Outgassing-free means in the present context that the material is virtually outgassing free in the sense that it releases only trace amounts of compounds, i.e. defined as being less than a limit value in µg/g when subjected to a test at a specified temperature and duration. This means that the material does not outgas a total amount of volatile organic compounds larger that a limit value, when being subjected to a specific test.

The outgassing can be determined by different test methods, for example thermal desorption followed a dynamic collection on an intermediary adsorbing device.

The test method involves following steps:
Obtaining a test piece of carbon fiber felt material and
Noting the weight of the test piece at 25°, RH 50% and 1 atm and
Placing it in a heated enclosure that is continuously subjected to a gas stream of nitrogen or helium or other noble gas at 50° C., so that any possible volatile compounds that could be outgassed are removed by the gas stream until they reach an intermediate adsorbing device i.e. a cold trap that condenses and collects the compounds. This procedure is continued for 30 minutes at 50° C.

After removing the sample from the gas stream, the cold trap is quickly heated so as to liberate the whole collected sample at the same time, which is then by the gas stream transported into a Gas Chromatography-Flame Ionization Detector (GC-FID) or a Gas Chromatography-Mass Spectroscopy (GC-MS) equipment for a qualitative and quantitative determination to identify the amount of released volatile compounds, and comparing it with a set limit value.

The outgassing is expressed in µg volatile compounds released per g carbon fiber felt test material. The outgassing, i.e. the amount of volatile compounds released from the test piece as obtained by the above test method, should be <10 µg/g to be considered out-gassing free in the context of the present disclosure. Non activated carbon felt material may typically have an out-gassing value <10 µg/g, and activated carbon felt material may typically have an outgassing value of approximately 1 µg/g, when tested as described above.

The use of an outgassing-free material for the seal can contribute in improving the cleanliness and extending the service life of the adsorbent panel of the filter assembly, since the carbon fiber sealing material as such does not release any undesired substances, during use or during regeneration, which may be absorbed by the adsorbent panel. In contrast, traditional sealing materials such as potting or adhesives may release volatile organic compounds when exposed to temperatures above 50° C., which may unnecessarily load the adsorbent materials of the adsorbent panel and prematurely exhaust the adsorbents, thereby unnecessarily reducing the service life of the panel. The materials of the adsorbent panel are suitably also outgassing free according to the above definition.

The disclosed way of sealing an adsorbent panel to a frame by means of carbon fiber felt material in order to obtain an air filter assembly may be applicable to various types of adsorbent panels.

The adsorbent panel may have any shape suitable for mounting in a frame. The adsorbent panel may typically have a generally square or rectangular shape and a certain thickness in the airflow direction, and can for example have a size of 300×300×20 mm to 1200×1200×100 mm.

Figure 3A:
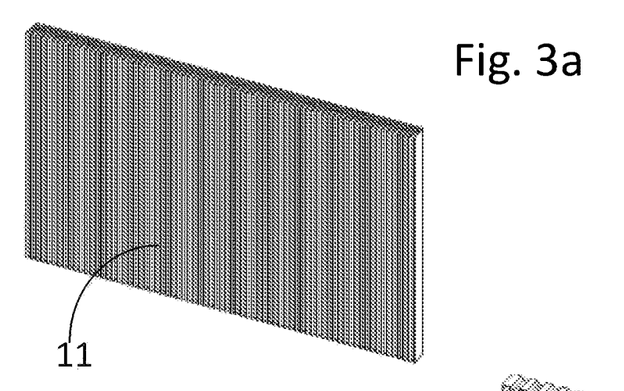
FIGS. 3a-3c schematically illustrate adsorbent panels that may be used in the air filter assembly according to the present disclosure.

The adsorbent panel is suitably self-supporting and may include a heat resistant carrier structure holding (carrying) the heat resistant porous adsorbent material for adsorbing the molecular contamination, preferably in the form of a self-supporting structure. The term "self-supporting" implies that the adsorbent panel can maintain its three-dimensional shape under normal operating conditions in air filtration applications, without being supported by an additional support member. The self-supporting property of the adsorbent panel makes the panel resilient to deformation and thus makes the need of an adhesive connection between adsorbent panel and the frame unnecessary, and thus allows sealing with carbon fiber felt material. The carrier structure may advantageously comprise heat resistant fibers, e.g. bi-component fibers, holding the heat resistant porous adsorbent material for adsorbing the molecular contamination, and can be in the form of a pleatable sheet or web including the porous adsorbent material (FIG. 3a). If desired, the heat resistant fibers holding the adsorbent material can be placed between two layers of heat resistant nonwoven material. A pleated filter media used in the air filter assembly does preferably not release particles above an ISO Class 6 environments as defined by ISO standard 14644-1.

Alternatively, the adsorbent panel may include a carrier structure in the form of a honeycomb material (FIG. 3b) or open cell foam or other sponge-like material (FIG. 3c), to which adsorbent material is adhered. A honeycomb structure can be made of activated carbon on a paper or ceramic structure or can be constructed from a base material that can be carbonized and activated as a whole. The patents U.S. Pat. No. 6,9646,95, EP 04724071 and U.S. Ser. No. 10/344, 248, show a carbon monolith to be regenerated by direct electrical heating. Honeycomb or monolith based systems have a fixed geometry that may limit the flexibility in use, and may have a slightly higher pressure drop than a pleated sheet of heat resistant fibers.

The adsorbent material may for example be in the form of adsorbent beads, preferably spherical beads, or adsorbent fibers, and can comprise any kind of adsorbent material that is capable of adsorbing molecular contamination such as activated carbon or manmade/artificial adsorbents having adsorbent properties similar to e.g. an activated carbon, but having a size distribution of the pore system that allows good adsorption as well as substantially complete desorption when heated, which make them very suitable for regeneration, for example porous polymeric adsorbents. One commercial example is the Dowex Optipore™ product range.

The heat resistant carrier structure, is heat resistant in the sense that it has an internal three-dimensional structure with the heat resistant fibers and the adsorbent material that does not melt or burn when exposed to temperature of the regeneration cycle. However, even though the internal three-dimensional structure (i.e. the heat resistant fibres or honeycomb or sponge structure) can withstand high temperatures, the adsorbent panel may also have an external three-dimensional structure (e.g. pleated structure or a cuboid), that may in some cases sag slightly when exposed to high temperature. In order to prevent deformation during the regeneration cycle, the adsorbent panel may therefore further comprise a heat resistant support member, preferably in the form of a grid having a three-dimensional shape corresponding to the shape of the adsorbent panel.

The air permeable adsorbent panel is preferably heat resistant to melting and burning for temperatures up to 300° C., and is suitably configured to withstand regeneration by heated gas flow at a temperature of 100-300° C. at 1 atm, or to withstand regeneration by heated gas flow at a static pressure below 1 atm at a temperature of 50-300° C. Alternatively, the air permeable adsorbent panel may be configured to withstand regeneration by evacuation below 1 atm and clean gas refilling procedure. Such evacuation and clean gas filling procedure may be repeated until a desired regeneration result is obtained, and it can be carried out as a batchwise procedure.

The carbon fiber felt material used for the sealing between adsorbent panel and frame is preferably compressible to such an extent that it has a thickness when installed in the air filter assembly, which is 50-70% of the initial original thickness before installation in the air filter assembly at the most compressed points. By being compressible, the carbon fiber felt material can also follow the surface shape of the panel edge to be sealed and fill any minor irregularities in the surface thereof. The carbon fiber felt material may further preferably be resilient, in order to be able to adapt to dimensional changes due to heat expansion of the different materials during the regeneration cycle, and in addition such that it can expand back to its original thickness if, or when, the air filter assembly is disassembled. This also means that if the panel would accidentally become displaced in the frame, so that the distance between the frame and the increases, the carbon fiber felt material can expand, thereby maintaining the space between frame and adsorbent panel filled with carbon fiber felt material, ensuring that the seal is maintained.

The compressibility and recovery of the carbon fiber felt material can be established by means of a test based on ASTM F 36.

The method includes the following steps carried out at 25° C. and 1 atm:
- Cutting a square test piece of 1.76 cm$^2$ of carbon fiber felt material and placing it on a flat solid surface
- Noting the original thickness ($T_O$) of the test piece
- Positioning a plate having a defined weight exposing the test piece to a force of 10N and the same area as the test piece on top of the test piece
- Noting the compressed thickness ($T_C$) of the test piece
- Removing the plate from the test piece
- Noting the recovered thickness ($T_R$) of the test piece
- The compressibility is $C=100*(T_O-T_C)/T_O$ and the recovery is $R=100*(T_R-T_C)/(T_O-T_C)$ A carbon fiber felt material suitable for use as sealing material in the air filter assembly of the present invention may preferably have a compressibility of C=30-80% and a recovery of R=40-60% when $T_O$ is 2-3 mm.

The carbon fiber felt material may preferably be obtained by methods available in the art, for example by carding, carding and needle punching to using previously made carbon fibers. Different methods to produce carbon fiber felt can be found in the literature e.g. WO 2015/099504 A1.

The carbon fiber felt material may advantageously include activated carbon fiber, whereby molecular contamination in any minimal air flow accidentally escaping the adsorbent panel and instead flowing via the carbon fiber felt material seal will be adsorbed by the sealing material, thus further improving the efficiency of the air filter assembly. Activated carbon fibers are available in the art, for example U.S. Pat. No. 7,517,832 B2 discloses a method of making activated carbon fibers and corresponding felt products, using a fibrous polymer starting material e.g. acrylic (PAN), pitch, rayon, phenol produced be e.g. melt spinning. After formation, carbon fibers are produced by carbonization of the polymer fibre in an inert or low oxygen environment, followed by activation using water and small amounts of oxygen or chemical activation methods. Activated carbon fibers have a very fast adsorption and desorption rate compared to granular or powdered activated carbon, has a large amount of adsorption at low concentration, and can be processed into various forms such as felt, fabric, and paper.

The carbon fiber felt material may preferably be in the form of one or more strips or bands having a combined total length at least corresponding to the circumference or perimeter of the air permeable adsorbent panel. In case the side edge surfaces of the adsorbent panel are substantially even, the carbon fiber felt material may be arranged flat between the adsorbent panel and the frame. If desired two or more layers of carbon fiber felt material can be arranged on top of each other, to obtain a larger combined thickness. This may be advantageous for example if the side edge of the adsorbent panel has a somewhat uneven surface, for example along the edge of a pleated adsorbent panel. The thickness of one layer of carbon fiber felt may be in the interval from 1-20 mm, but may suitably be 2-3 mm or 3-6 mm, depending on the shape and type of the adsorbent panel.

As mentioned, the adsorbent panel may for example preferably be a pleated adsorbent panel. A pleated adsorbent panel may have an increased surface area available for air passage, thus increasing the filtration efficiency while reducing the pressure drop across the filter assembly. The adsorbent material from which the panel is made may have first been pleated and thereafter cut into a panel. This means that the panel may have two first side edges, which are parallel to the pleats and two second side edges, which are in a in a cross-pleat direction, i.e. having a zig-zag appearance. In this context, the term "a pleat" refers to the two parallel sections of filter material that are located on each side of a folding line. This is illustrated schematically in FIG. 2. The "cross-pleat direction" is perpendicular to the folding lines.

The frame may advantageously be a frame arrangement comprised of frame elements and fixtures that can be disassembled, so that the carbon felt and adsorbent panel can be removed from the frame. This allows the frame to be recovered and used in new air filter assembly when the service life of carbon felt and adsorbent panel has expired. The frame elements are suitably constructed so as to have an intermediate wall part, and secondary wall parts extending, preferably substantially perpendicularly, from the intermediate part on each side thereof, in order to prevent the adsorbent panel from falling out of the frame.

The adsorbent panel and the piece of carbon fiber felt material may suitably be held in position in the frame of the air filter assembly by means of a clamp inserted between the adsorbent panel and the secondary wall parts of the frame. The clamp can be in the form of a clamp bar, suitably having a length approximately corresponding to the length of the adsorbent panel, and suitably having a width approximately corresponding to the distance between the adsorbent panel and the secondary wall part of the frame element. A first pair of frame elements may suitably be arranged to hold two first sides of the adsorbent panel, and a second pair of frame elements may suitably be arranged to hold two second sides of the adsorbent panel. In the case of an adsorbent panel in the form of a pleated filter media panel, the first pair of frame elements, and the first sides of the adsorbent panel, will be parallel to the pleats of the adsorbent panel. A clamp used to hold the adsorbent panel and the piece of carbon fiber felt material in position will typically have a length direction substantially parallel with said first pair of frame elements, and the first sides of the adsorbent panel. Clamps will typically be arranged between the adsorbent panel and each of the frame elements of said first pair of frame elements. One frame element of the second pair of frame elements is preferably connected to the frame elements of the first pair of frame elements by non-permanent fasteners, such screws, so that they are arranged to be easily assembled and disassembled. Thereby, the filter frame assembly can be easily opened and an adsorbent panel can be inserted or removed.

In case the adsorbent panel is a pleated filter media panel, a part of the carbon fiber felt, may be folded to enclose the edge of the filter media at the outermost pleat, on each of the first two side edges of the pleated filter media panel respectively. The piece of carbon fiber felt material is thus inserted between the two parallel sections of filter material of the outermost pleat. In this case, a clamp may be arranged along the outermost pleat in order to secure the carbon fiber felt folded to enclose the edge of the filter media at the outermost pleat against the inner side of the frame. The clamp can preferably comprise a substantially flat insertion piece, having a length approximately corresponding to the length of the pleat. The substantially flat piece of the clamp may be inserted between the two parallel sections of filter material of the outermost pleat to keep the folded piece of carbon fiber felt material in position. The clamp may further comprise a frame supporting piece, which extends from the substantially flat piece at an angle with respect to the substantially flat piece, said angle preferably being 70-100°. The frame supporting piece may suitably be configured to rest against an inner side of the frame element.

When a clamp having a substantially flat insertion piece, as described above, is used to secure piece of carbon fiber felt material, the substantially flat piece of the clamp can be inserted between the two parallel sections of filter material of the outermost pleat such that the frame supporting piece rests against the secondary wall part.

The clamp can be oriented so that the corner between the substantially flat piece and the frame supporting piece is closer to the intermediate part than the outermost edge of the substantially flat insertion piece. Thereby, the outermost pleat and consequently the piece of carbon fiber felt material will be held securely to the filter frame. In this case the outermost edge of the frame supporting piece would typically be directed away from the intermediate part of the frame element.

Alternatively, the clamp can be oriented so that the corner between the substantially flat piece and the frame supporting piece is farther away from the intermediate part than the outermost edge of the substantially flat insertion piece. This clamp orientation gives a higher clamping pressure on the outermost pleat, and consequently the piece of carbon fiber felt material will be pinched between the edge of the insertion piece and the frame wall, and thus be held even more securely to the filter frame. In this case the outermost edge of the frame supporting piece would typically be directed toward the intermediate part of the frame element.

Another part of the carbon fiber felt may be arranged flat between the frame and the edges of the pleats in a cross-pleat direction on each side of the adsorbent panel, respectively, i.e. to be arranged at the two second side edges mentioned above.

The adsorbent panel and the carbon fiber felt material can be held in position and secured in the frame by attachment rods. A net or scrim can be arranged on each side of the panel to protect it from external forces.

Regardless of the type of clamp used, the attachment rods and the clamps may suitably be configured to interact in holding the adsorbent panel in position in the frame. For example, notches can be provided in the clamps, to allow insertion and mounting of the attachment rods on the frame elements between the clamp and the frame element secondary wall part of the first pair of frame elements. In the case of a clamp having a substantially flat insertion piece and a frame supporting piece, notches can be provided as a cut out in frame supporting piece. In case of a solid clamp bar, the notches can be in form of a recess giving room for the attachment rod. The attachment rods may then be secured to the frame element by, for example, a fastener, such as a screw or latch or other suitable fastening means 12.

Alternatively, the attachment rods may be provided with a protruding tongue and an end surface at each end of the attachment rod. The clamps may then have an opening or recess for receiving the protruding tongue of the attachment rods, so that the tongue of the attachment rods will rest on a side of the opening or recess and the end surfaces of the attachment rods will rest on the clamp surface adjacent the opening or recess, when mounted. Further, one or more fixation rods may suitably be arranged between the second pair of frame elements. The fixation rods will be positioned at an angle or perpendicularly to the attachment rods, and may suitably be secured to each of the frame elements of the second pair of frame elements by, for example, a fastener, such as a screw or latch or other suitable fastening means, to reduce the risk of bulging of the filter panel. Fixation rods are advantageously arranged on both sides of the adsorbent panel, to improve stability. The net or scrim arranged on each side of the adsorbent panel may suitably have different size: A smaller net or scrim may thus be arranged on the side of the adsorbent panel where the clamps are inserted between the adsorbent panel and the secondary wall part of the frame elements, advantageously having a size which corresponds to the opening in the frame formed by the frame elements, whereas a larger net or scrim may be arranged on the opposite side of the adsorbent panel, suitably being inserted between the adsorbent panel and the other secondary frame wall part, and preferably having a size which is larger than the opening in the frame formed by the frame elements. This means that once all frame elements and the larger net or scrim have been assembled, the air filter assembly may effectively be assembled or disassembled by placing or removing the adsorbent panel, the carbon fiber felt piece, smaller net or scrim, the clamps, the attachment rods and the fixation rods, without the need of disassembling the frame.

The above described frame arrangements can be used in connection with any kind of adsorbent filter media panel, and are applicable also in cases where no carbon fiber felt is arranged between the adsorbent panel and the frame.

The air filter assembly described above is suitably regenerable by means of the following method.

This disclosure also relates to a method of regenerating the air filter assembly described above, comprising the following steps:

Demounting the heat resistant regenerable air filter assembly from a service position in an air handling system of a facility including an air supply application;

Mounting the heat resistant regenerable air filter assembly in a regeneration equipment;

Performing a regeneration cycle until a specified cleanliness or outgassing level are achieved;

Demounting the regenerated heat resistant regenerable air filter assembly from the regeneration equipment;

Remounting the regenerated heat resistant regenerable air filter assembly back into it's service position.

The regeneration cycle involves exposing the air filter assembly to a heated gas flow at a temperature of 100-300° C. at 1 atm or a heated gas flow at a static pressure below 1 atm at a temperature of 50-300° C. until a desired desorption of molecular contamination has been achieved; or to evacuation below 1 atm and clean gas refilling procedure, which may be repeated until a desired desorption of molecular contamination has been achieved. This regeneration temperature range allows regeneration of air filter assemblies with an adsorbent filter media panel that withstands the regeneration temperature without sagging or decomposing, but which would not withstand a pyrolysis treatment.

The specified cleanliness or outgassing level, which defines when the regeneration is complete can, for example, be established by means of a Proton-transfer-reaction mass spectrometry (PTR-MS) equipment. A suitable outgassing value threshold at the end of the regeneration cycle can for example be 0.1 ppb (volume), at the specified air flow, i.e. the intended work air flow for the filter.

When the air filter assembly has been demounted from its service position, it is typically replaced by another air filter assembly unit having the same configuration, so that the air supply application need not be taken out of service while the first air filter assembly is regenerated. It is of course possible to have several air filter assembly units circulating between the service position in an air handling system and the regeneration equipment. If so, the units currently not in service or in regeneration can be stored under clean gas conditions.

The regeneration equipment may be located at the same site as the air supply application. However, it may be more efficient to arrange a central regeneration facility serving a plurality of facilities having air supply applications with air handling systems where an air filter assembly as defined herein is used. In this case the method of regenerating the air filter assembly may further comprise that after demounting the heat resistant regenerable air filter assembly from its service position in the air handling system of the cleanroom or production equipment therein, placing it in a specified transport container and transporting it to the regeneration facility the method comprises the regeneration equipment; and after demounting the heat resistant regenerable air filter assembly from the regeneration equipment, placing it in a fresh specified transport container and transporting it back to the cleanroom facility. Optionally, the regenerated heat resistant regenerable air filter assembly can be stored under gas clean conditions until taken back into service. Some large hydrocarbons may not be possible to remove by means of the regeneration described above, i.e. without pyrolysis. This may be acceptable as long as the outgassing value at the end of the regeneration cycle is not exceeded. However, after a number recycling cycles, there may be a situation where the amount of large hydrocarbons that cannot be removed by the above regeneration method may have accumulated in the adsorbent panel to such an extent that an acceptable outgassing value can no longer be reached, or the use time between two regenerations becomes too short due to reduced adsorption capacity resulting from the accumulation of large hydrocarbons. In this case, the adsorbent panel may need to be discarded and replaced by a newly manufactured one.

EXAMPLE EMBODIMENTS

The air filter assembly of the present disclosure will now be described with reference to the accompanying drawings, in which preferred example embodiments of the disclosure are shown.

FIGS. 1*a-b* and 2*a-d* schematically illustrate examples of a heat resistant regenerable air filter assembly of the present disclosure, comprising an air permeable adsorbent panel 1 mounted in a frame 2. The adsorbent panel comprises a heat resistant carrier structure 11 (see FIGS. 3*a-c* and 4) comprising a heat resistant porous adsorbent material for adsorbing molecular contamination and being configured to be regenerated by desorption. The air filter assembly comprises a heat resistant sealing material 3 between the adsorbent panel 1 and the frame 2. The heat resistant sealing material 3 is a carbon fiber felt material arranged between the air permeable adsorbent panel and the frame so as to fill the distance therebetween, thereby preventing leakage of unfiltered air through the heat regenerable air filter assembly during use and during regeneration.

Figure 1A:
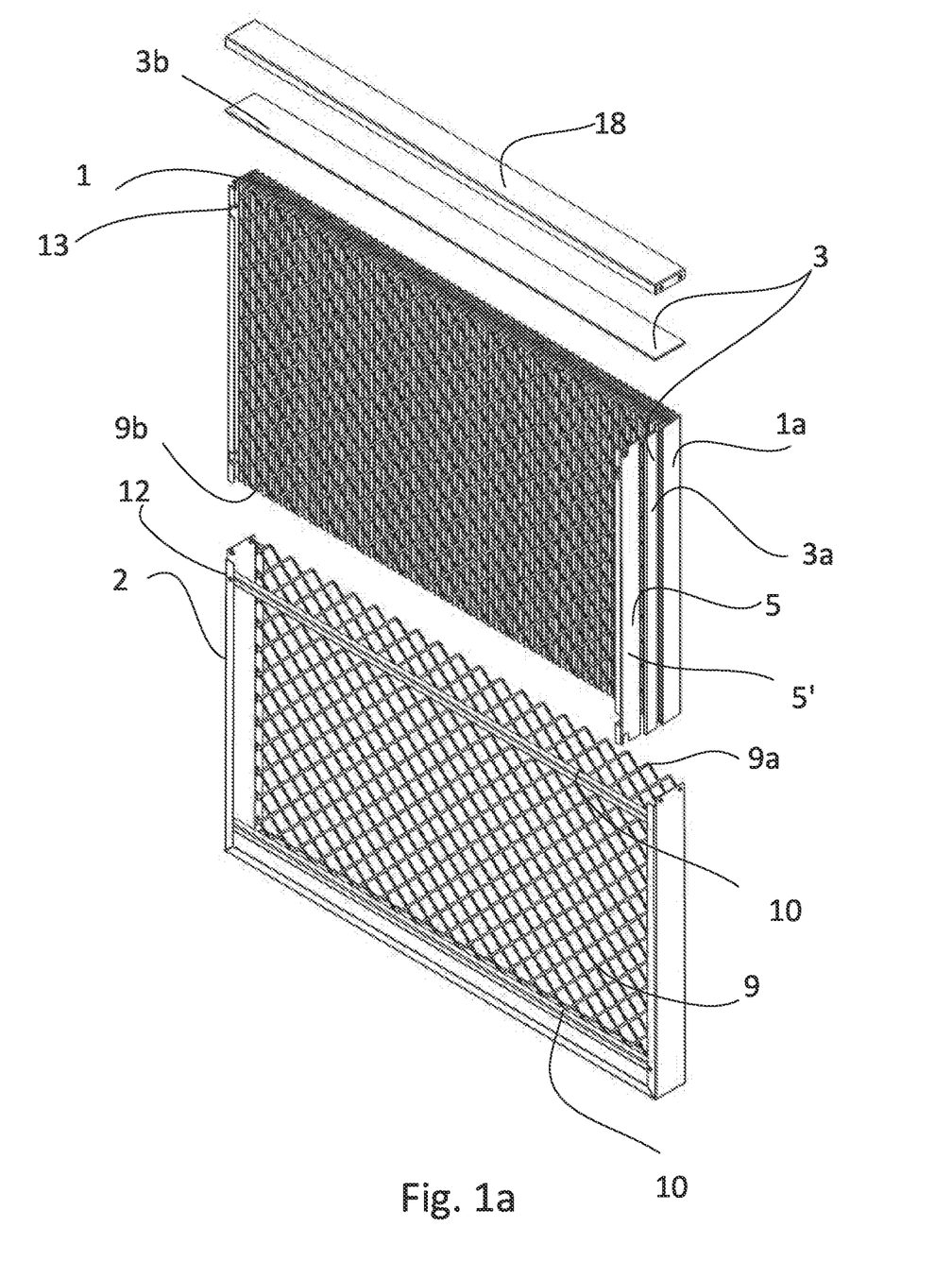
FIG. 1a schematically illustrates an exploded view of an example of an air filter assembly according to the present disclosure.
Figure 1B:
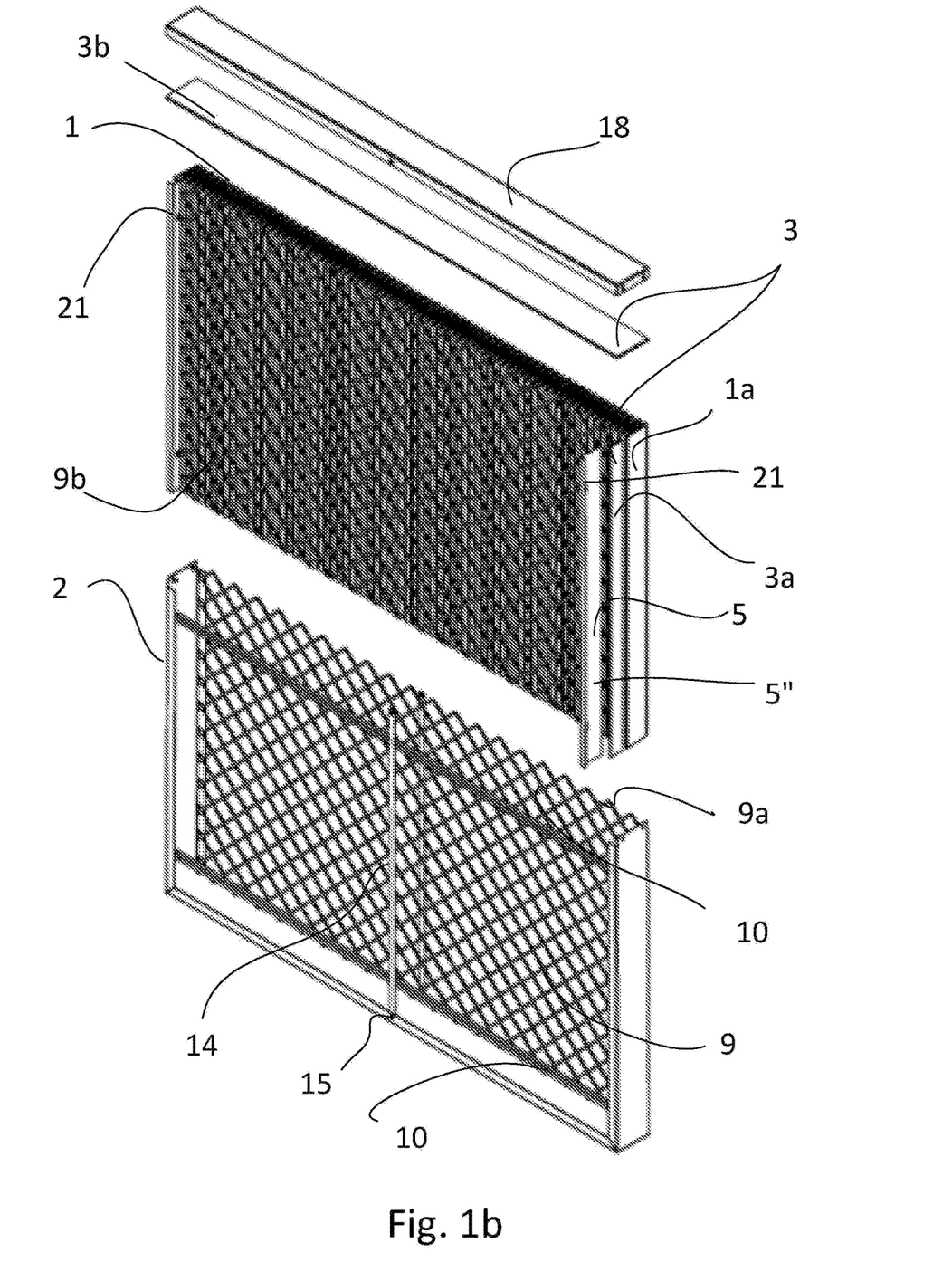
FIG. 1b schematically illustrates an exploded view of another example if an air filter assembly according to the present disclosure.
Figure 2A:
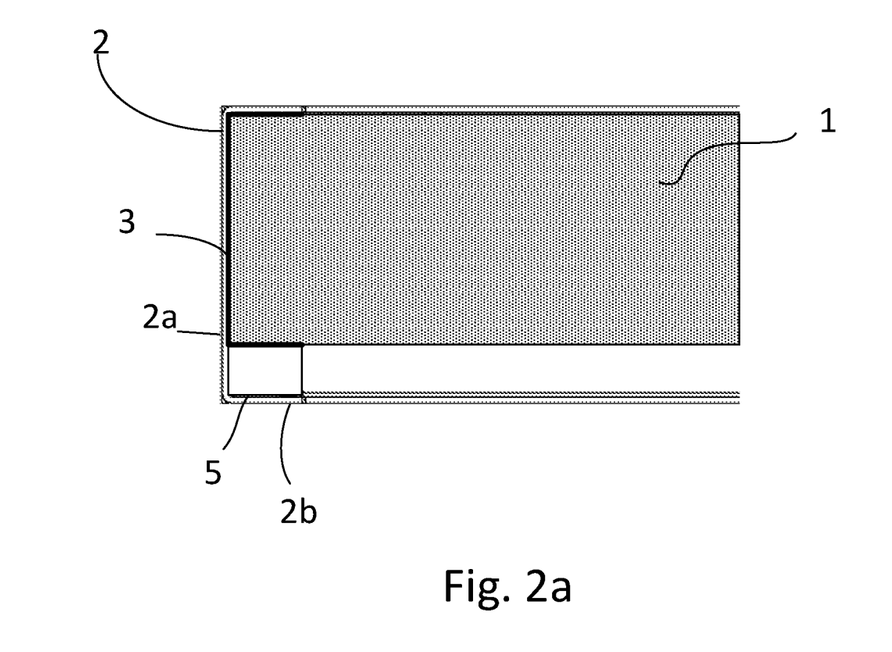
FIG. 2a is a schematic cross-sectional partial view of an air filter assembly according to the present disclosure.
Figure 2B:
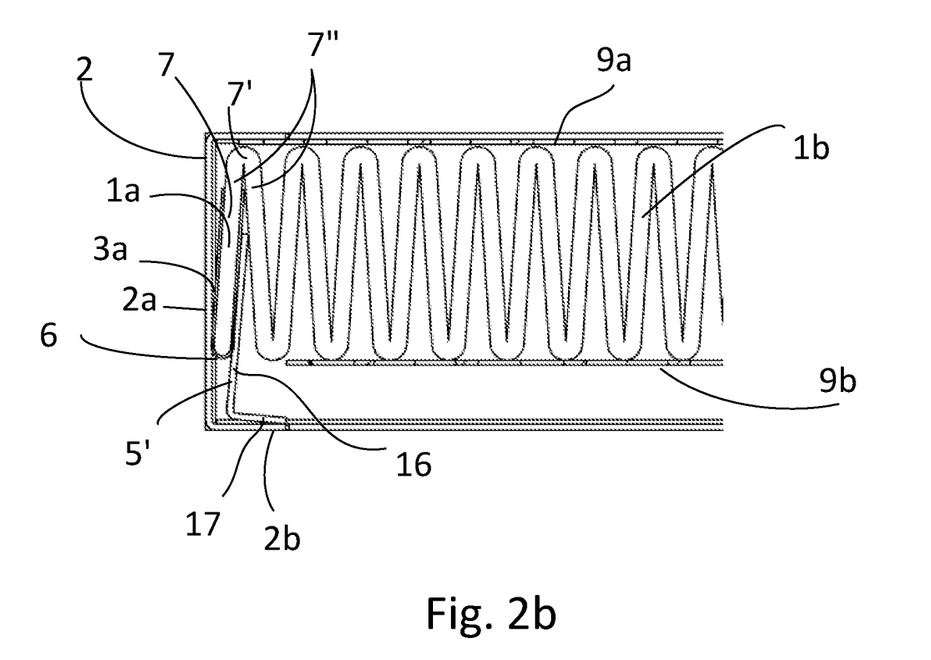
FIG. 2b is a schematic cross-sectional partial view of an another example of an air filter assembly according to the present disclosure.
Figure 2C:
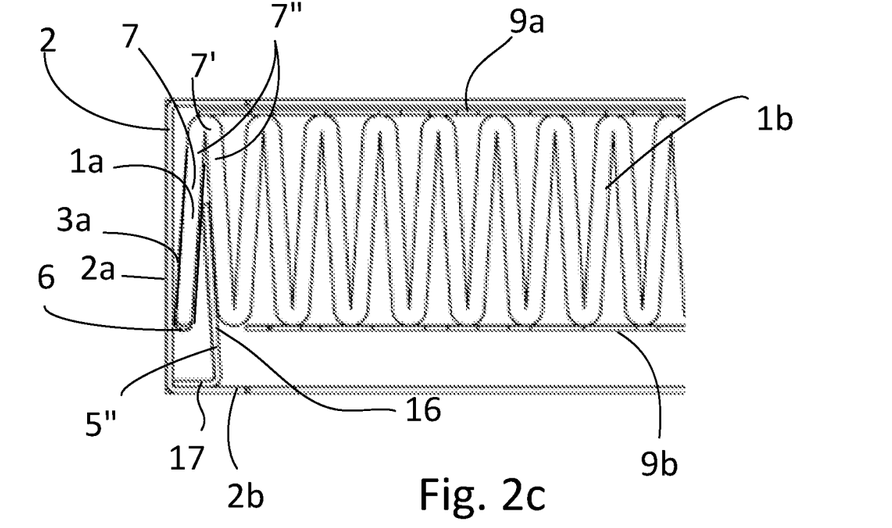
FIG. 2c is a schematic cross-sectional partial view of yet another example of an air filter assembly according to the present disclosure.
Figures 2D, 2E:
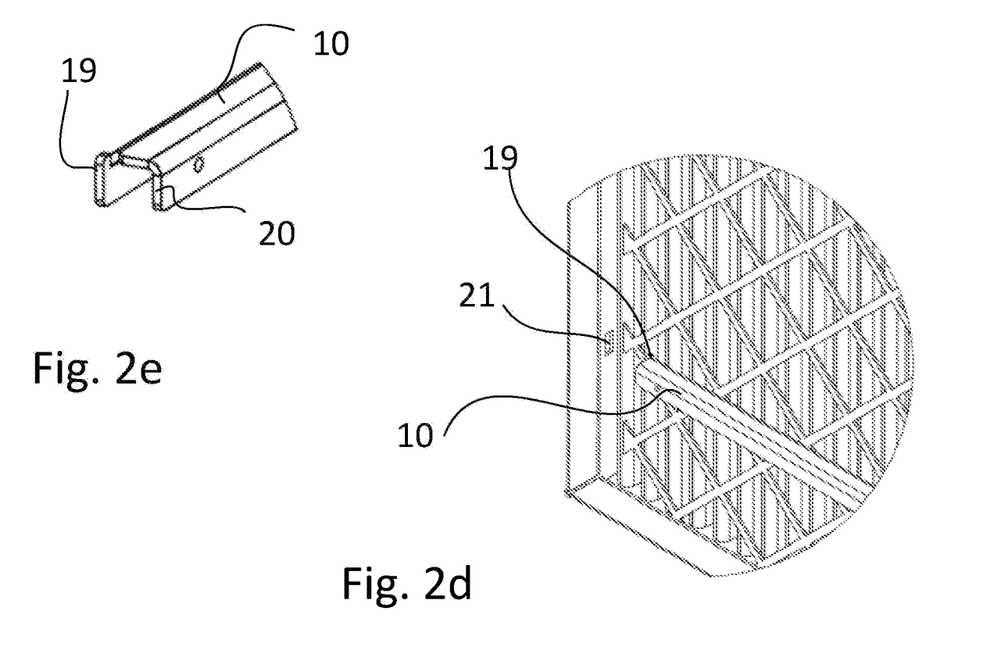
FIG. 2d is a partial perspective view of an air filter assembly including an attachment rod as shown in FIG. 2e.
FIG. 2e is a partial perspective view of an attachment rod also shown in FIG. 2d.

The frame elements are constructed so as to have an intermediate wall part 2*a*, and secondary wall parts 2*b* extending from the intermediate part 2*a* on each side thereof, in order to prevent the adsorbent panel from falling out of the frame. The frame 2 is constructed with two pairs of frame elements: a first pair of frame elements arranged to hold two first sides (left and right sides in FIGS. 1*a-b*) of the adsorbent panel 1, and a second pair of frame elements arranged to hold two second sides (top and bottom sides in FIGS. 1*a-b*) of the adsorbent panel. As shown, in the case of an adsorbent panel in the form of a pleated filter media panel, the first pair of frame elements and the first sides of the adsorbent panel will be parallel to the pleats of the adsorbent panel 1. The carbon fiber felt material 3 is in the form of one or more strips or bands 3*a*, 3*b* having a combined total length at least corresponding to the circumference or perimeter of the air permeable adsorbent panel 1. The strips or bands 3*a* of the carbon fiber felt is folded around the adsorbent panel as illustrated in FIG. 2*a*, or around the edge of the outermost pleat, as illustrated in FIGS. 2*b-d*. In the shown examples in FIGS. 1*a-b* and 2*b-e*, the adsorbent panel 1 is a pleated filter media panel, and a part 3*a* of the carbon fiber felt is folded to enclose the edge 6 of the filter media at the outermost pleat 7 on each side 1*a* of the pleated filter media panel, and another part of the compressible carbon fiber felt is arranged flat on the edges of the pleats in a cross-pleat direction on each side of the adsorbent panel. The outermost a pleat refers to the two parallel sections 7" of filter material that are located on each side of the outermost folding line 7', as illustrated schematically in FIG. 2. The "cross-pleat direction" is perpendicular to the folding lines, and gives the cross-pleat side edge 1*b* a zig-zag appearance. By this application the carbon fiber felt material will also seal the edges of the pleated media pack of the adsorbent panel and stop any adsorbent particles from escaping from the media edges.

The carbon fiber felt folded to enclose the edge 6 of the filter media at the outermost pleat 7 is held in place by means of a clamp 5 that arranged along the outermost pleat and inserted in the pleat, in order to secure the carbon fiber felt folded to enclose the edge of the filter media at the outermost pleat against the inner side of the frame.

As shown schematically in FIGS. 2*a-d*, a clamp 5, 5', 5" is used to hold the adsorbent panel 1 and the piece of carbon fiber felt material 3 in position. The clamp is inserted between the adsorbent panel and the frame element.

The clamp illustrated in FIGS. 2*b-d* comprises a flat insertion piece 16 inserted between the two parallel sections of filter material of the outermost pleat 1*a* to keep the folded piece of carbon fiber felt material 3 in position. The clamp further comprises a frame supporting piece 17, which extends from the flat piece 16 at an angle with respect to the substantially flat piece and is configured to rest against the inner side of the secondary wall part 2*b* of the frame element.

As shown in FIG. 2*b*, the clamp 5' can be oriented so that the corner between the insertion piece 16 and the frame supporting piece 17 is closer to the intermediate wall part 2*a* than the outermost edge of the insertion piece. In this case the outermost edge of the frame supporting piece is directed away from the intermediate wall part 2*a* of the frame element.

Alternatively, as shown in FIG. 2*c*, the clamp 5" can be oriented so that the corner between the insertion piece 16 and the frame supporting piece 17 is farther away from the intermediate wall part 2*a* than the outermost edge of the insertion piece. In this case the outermost edge of the frame supporting piece is directed towards the intermediate wall part 2*a* of the frame element. FIGS. 1*a-b* illustrate how the frame is comprised of frame elements and fixtures that can be disassembled, so that the carbon felt and adsorbent panel can be removed. The top frame element 18 in FIGS. 1*-b* of the second pair of frame elements is connected to the frame elements of the first pair of frame elements by non-permanent fasteners, in the form of screws, to be easily assembled and disassembled.

The adsorbent panel 1 and the carbon fiber felt material is held in position and secured in the frame, for example by attachment rods 10, as illustrated in FIGS. 1a-b. A net or scrim 9, 9a, 9b is arranged on each side of the panel to protect it from external forces. As illustrated in FIGS. 1a-b and 2b-c, the net or scrim arranged on each side of the adsorbent panel have different size: A smaller net or scrim 9b having a size corresponding to the opening in the frame formed by the frame elements is arranged on the side of the adsorbent panel 1 where the clamps 5, 5', 5" are inserted between the adsorbent panel 1 and the secondary wall part 2b of the frame elements, and a larger net or scrim 9a having a size which is larger than the opening in the frame is arranged on the opposite side of the adsorbent panel, between the adsorbent panel and the other secondary frame wall part.

The attachment rods 10 and the clamps 5, 5', 5" are configured to interact in holding the adsorbent panel in position in the frame. In the example of FIG. 1a, notches 13 are provided in the clamps to allow insertion and mounting of the attachment rods 10 between the clamp 5' and the frame element secondary wall 2b. The attachment rods are secured to the frame element by a fastener 12.

In the example of FIG. 1b, the attachment rods 10 are provided with a protruding tongue 19 and an end surface 20 at each end of the rod, also illustrated in FIGS. 2d-e. The clamp 5" has an opening 21 for receiving the tongue e and the end surface 20 s will rest on the clamp surface adjacent the opening 21 when mounted. Further, fixation rods 14 are arranged between the frame elements, and are secured to each of the top and bottom frame elements by a fastener 15.

Figure 3B:
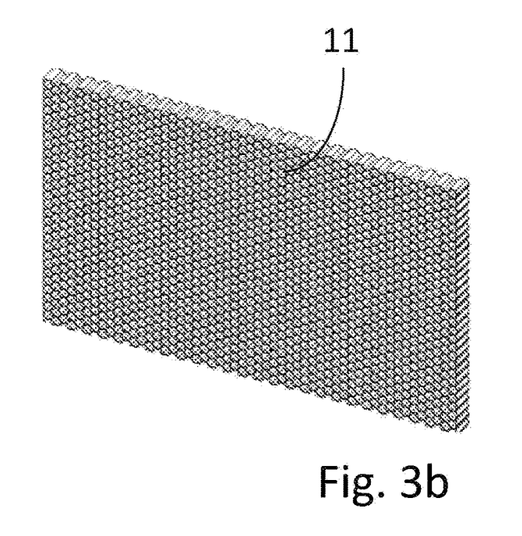
Figure 3C:
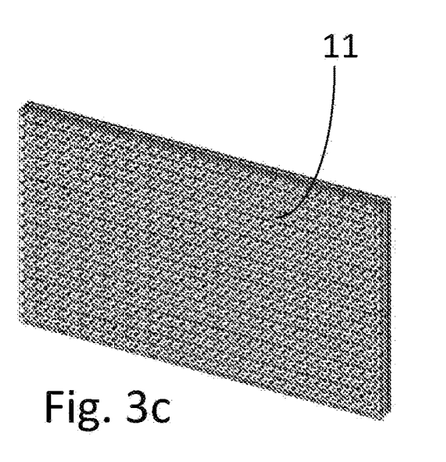

FIGS. 3a-3c illustrate three alternatives for a carrier structure to which adsorbent material is adhered: in FIG. 3a, a pleated sheet of heat resistant fibers; in FIG. 3b, a honeycomb material; and in FIG. 3c, a spongelike material. All these carrier structures can be held in frame assemblies as the ones illustrated in FIGS. 1a-b, with a suitable choice of clamp.

Figure 4:
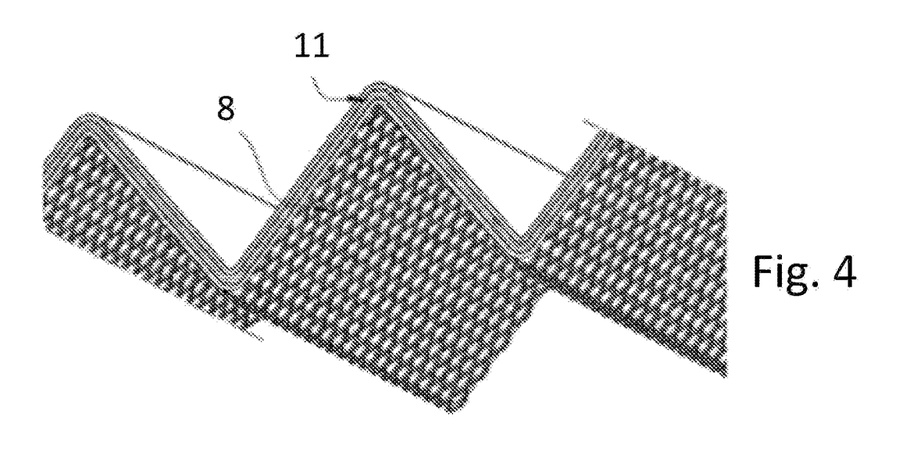
FIG. 4 schematically illustrates a part of an adsorbent panel including a support member.

FIG. 4 illustrates a pleated adsorbent panel which comprises a heat resistant support member 8 in the form of a grid having a three-dimensional shape corresponding to the shape of the adsorbent panel. The pleats of the panel in FIG. 4 are shown extended to make the support grid visible.

Figure 5:
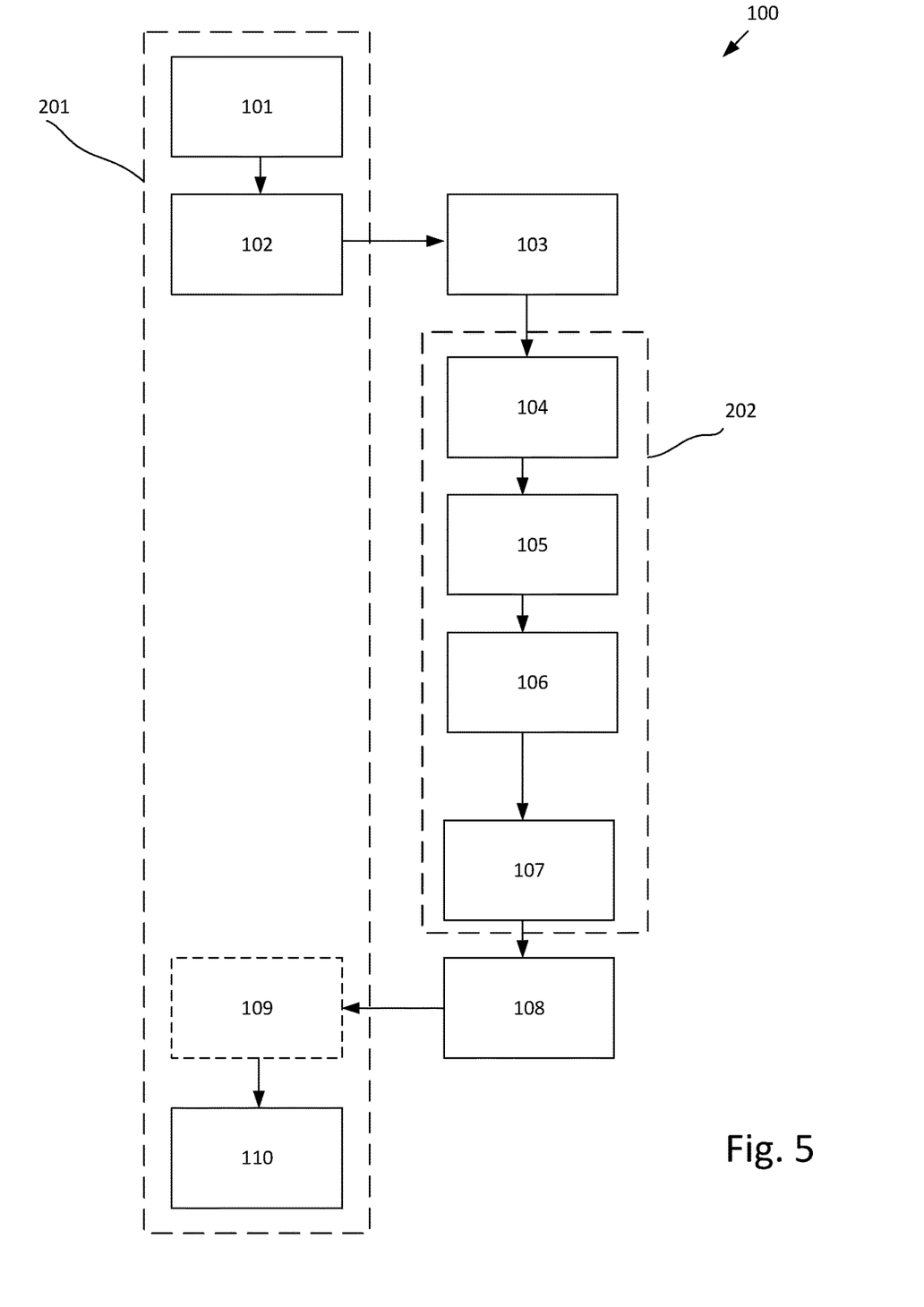
FIG. 5 is a schematic illustration of a method of regenerating an air filter assembly according to the present disclosure.

FIG. 5 schematically illustrates a method of regenerating the above air filter assembly, involving the following steps: Demounting (101) the heat resistant regenerable air filter assembly from a service position in an air handling system of a facility (201) including an air supply application; Mounting (104) the heat resistant regenerable air filter assembly in a regeneration equipment; Performing (105) a regeneration cycle until a specified cleanliness or outgassing level are achieved; Demounting (106) the regenerated heat resistant regenerable air filter assembly from the regeneration equipment; Remounting (110) the regenerated heat resistant regenerable air filter assembly back into it's service position. The method may further comprise the steps that after demounting the heat resistant regenerable air filter assembly from its service position in the air handling system of the a facility (201) including the air supply application, placing it in a specified transport container (102) and transporting it (103) to a regeneration facility (202) comprising the regeneration equipment; and after demounting the heat resistant regenerable air filter assembly from the regeneration equipment, placing it in a fresh specified transport container and transporting it (108) back to the facility (201) including the air supply application. The method can optionally involve storing (109) the regenerated heat resistant regenerable air filter assembly under gas clean conditions until taken back into service.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

The invention claimed is:

1. A heat resistant regenerable air filter assembly for an air supplying application, comprising:
an air permeable adsorbent panel mounted in a frame, said panel comprising a heat resistant structure comprising a heat resistant porous adsorbent material for adsorbing molecular contamination and being configured to be regenerated by desorption,
said air filter assembly comprising a heat resistant sealing material between the adsorbent panel and the frame,
wherein the heat resistant sealing material is a carbon fiber felt material arranged between the air permeable adsorbent panel and the frame so as to fill the distance therebetween, thereby preventing leakage of unfiltered air through the heat regenerable air filter assembly.

2. The air filter assembly of claim 1, wherein the pressure drop over the carbon fiber felt seal as mounted is higher than the pressure drop over the adsorbent panel.

3. The air filter assembly of claim 1, wherein said air permeable adsorbent panel exhibits a pressure drop less than 100 Pa at 0.7 m/s face velocity.

4. The air filter assembly of claim 1, wherein the carbon fiber felt material is a compressible material, which when installed in the air filter assembly, has a thickness of 50-70% of the carbon fiber felt material thickness before installation between the air permeable adsorbent panel and the frame.

5. The air filter assembly of claim 1, wherein the carbon fiber felt material is in the form of one or more strips or bands having a combined total length at least corresponding to the circumference or perimeter of the air permeable adsorbent panel.

6. The air filter assembly of claim 1, wherein the adsorbent panel is a pleated filter media panel, and a part of the carbon fiber felt is folded to enclose the edge of the filter media at the outermost pleat on each side of the adsorbent panel, and another part of the carbon fiber felt is arranged substantially flat against the edges of the pleats in a cross-pleat direction on each side of the adsorbent panel.

7. The air filter assembly of claim 6, wherein a clamp is arranged along the outermost pleat in order to secure the carbon fiber felt folded to enclose the edge of the filter media at the outermost pleat against the inner side of the frame.

8. The air filter assembly of claim 1, wherein the heat resistant structure is self-supporting or includes a self-supporting carrier structure holding the heat resistant porous adsorbent material for adsorbing the molecular contamination.

9. The air filter assembly of claim 1, wherein the adsorbent panel further comprises a heat resistant support member.

10. The air filter assembly of claim 1, wherein the heat resistant carbon fiber felt material sealing material has an out-gassing value below 10 μg/g when tested at 50° C. and 30 min.

11. The air filter assembly of claim 1, wherein the carbon fiber felt material includes activated carbon fiber.

12. The air filter assembly of claim 1, wherein the adsorbent panel and the sealing carbon fiber felt are mounted in the frame, and the frame is comprised of frame elements and fixtures that can be disassembled, so that the carbon felt and adsorbent panel can be removed.

13. The air filter assembly of claim 1, wherein the air permeable adsorbent panel configured to withstand regeneration by heated gas flow at a temperature of 100-300° C. at 1 atm.

14. The air filter assembly of claim 1, wherein the air permeable adsorbent panel is configured to withstand regeneration by heated gas flow at a static pressure below 1 atm at a temperature of 50-300° C.

15. The air filter assembly of claim 1, wherein the air permeable adsorbent panel is configured to withstand regeneration by an evacuation below 1 atm and clean gas refilling procedure.

16. The air filter assembly of claim 1, wherein the air supplying application is a cleanroom application.

17. The air filter assembly of claim 1, wherein the air supplying application is an HVAC system for general ventilation of a building.

18. A method of regenerating the air filter assembly of claim 1, comprising the following steps:
Demounting the heat resistant regenerable air filter assembly from a service position in an air handling system of a facility including an air supply application;
Mounting the heat resistant regenerable air filter assembly in a regeneration equipment;
Performing a regeneration cycle until a specified cleanliness or outgassing level are achieved;
Demounting the regenerated heat resistant regenerable air filter assembly from the regeneration equipment; and
Remounting the regenerated heat resistant regenerable air filter assembly back into it's service position.

19. The method of claim 18, further comprising the steps:
After demounting the heat resistant regenerable air filter assembly from its service position in the air handling system of the a facility including the air supply application, placing it in a specified transport container and transporting it to a regeneration facility comprising the regeneration equipment;
After demounting the heat resistant regenerable air filter assembly from the regeneration equipment, placing it in a fresh specified transport container and transporting it back to the facility including the air supply application; and
Optionally storing the regenerated heat resistant regenerable air filter assembly under gas clean conditions until taken back into service.

20. The method of claim 18, wherein the regeneration cycle involves exposing the air filter assembly to:
a) a heated gas flow at a temperature of 100-300° C. at 1 atm or a heated gas flow at a static pressure below 1 atm at a temperature of 50-300° C. until a desired desorption of molecular contamination has been achieved; or
b) evacuation below 1 atm and clean gas refilling procedure, which can be repeated until a desired desorption of molecular contamination has been achieved.

* * * * *